US007021124B2

(12) United States Patent
Von Gutfeld et al.

(10) Patent No.: US 7,021,124 B2
(45) Date of Patent: Apr. 4, 2006

(54) METHOD AND APPARATUS FOR DETECTING LEAKS IN A FLUID COOLING SYSTEM

(75) Inventors: Robert J. Von Gutfeld, New York, NY (US); Hendrik F. Hamann, Yorktown Heights, NY (US); Jeffrey D. Gelorme, Burlington, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/928,396

(22) Filed: Aug. 27, 2004

(65) Prior Publication Data

US 2006/0042358 A1    Mar. 2, 2006

(51) Int. Cl.
*G01N 25/56* (2006.01)
(52) U.S. Cl. ........................................................ 73/73
(58) Field of Classification Search ................ 73/73
See application file for complete search history.

(56) References Cited

U.S. PATENT DOCUMENTS

| 4,143,177 | A | * | 3/1979 | Kovac et al. | 427/79 |
| 4,203,087 | A | * | 5/1980 | Kovac et al. | 338/35 |
| 4,277,742 | A | * | 7/1981 | Kovac et al. | 324/689 |
| 4,632,879 | A | * | 12/1986 | Tanaka et al. | 428/522 |
| 4,729,165 | A | * | 3/1988 | Fahrenschon | 29/846 |
| 5,325,312 | A | * | 6/1994 | Kidd | 340/605 |
| 5,918,469 | A | * | 7/1999 | Cardella | 62/3.7 |
| 5,966,076 | A | * | 10/1999 | Cantrell | 340/605 |
| 6,175,310 | B1 | * | 1/2001 | Gott | 340/604 |
| 6,313,900 | B1 | * | 11/2001 | Kawata | 349/153 |
| 6,690,281 | B1 | * | 2/2004 | Palmer | 340/604 |

* cited by examiner

*Primary Examiner*—Hezron Williams
*Assistant Examiner*—John Fitzgerald
(74) *Attorney, Agent, or Firm*—Wan Yee Cheung

(57) ABSTRACT

One embodiment of the present method and apparatus for detecting leaks in a fluid cooling system enables a user to rapidly detect fluid leaks in the vicinity of a microprocessor chip or other delicate item. In one embodiment, the invention comprises a detector and a border coupled to the detector and disposed peripherally about a protected item (e.g., the microprocessor chip or other delicate item). In one embodiment, the border is a layered structure that is adapted to complete an electrical circuit with the detector when the border comes into contact with fluid.

23 Claims, 4 Drawing Sheets

METHOD AND APPARATUS FOR DETECTING LEAKS IN A FLUID COOLING SYSTEM

BACKGROUND

The present invention relates generally to fluid cooling systems for electronic devices, and relates more particularly to the detection of leaks in fluid cooling systems.

As microprocessor chips decrease in size, the density of the circuitry embedded in the chips increases, resulting in higher density heat loads. Conventional means for cooling these chips therefore become less effective, which has led to the development of various water- or fluid-based cooling systems. Various cooling designs incorporating micro-channels and micro-ducts in place of conventional copper heat sinks have been proposed, e.g., wherein cooling fluid either directly contacts the chip or flows through a heat spreader.

Though fluid systems provide effective cooling, they run the risk of leaking cooling fluid onto the device (e.g., a microprocessor chip or other electronic device) being cooled. Fluid leaks in the vicinity of an electronic device can lead to short circuits, causing damage to costly chips and other device components. It is therefore of utmost importance to detect such leaks as quickly as possible in order to minimize the resultant damage.

Thus, there is a need in the art for a method and apparatus for detecting leaks in a fluid cooling system.

SUMMARY OF THE INVENTION

One embodiment of the present method and apparatus for detecting leaks in a fluid cooling system enables a user to rapidly detect fluid leaks in the vicinity of a microprocessor chip or other delicate item. In one embodiment, the invention comprises a border disposed peripherally about a protected item (e.g., the microprocessor chip or other delicate item) and a detector or electrical indicator coupled to the border for sensing a leak. In one embodiment, the border is a layered structure that is adapted to complete an electrical circuit with the detector when the border comes into contact with fluid.

BRIEF DESCRIPTION OF THE DRAWINGS

So that the manner in which the above recited embodiments of the invention are attained and can be understood in detail, a more particular description of the invention, briefly summarized above, may be obtained by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

In one embodiment, the present invention is a method and apparatus for detecting leaks in a fluid cooling system. Embodiments of the present invention enable leaks in fluid cooling systems, e.g., as used for cooling microprocessor chips and other electronic devices, to be rapidly detected. In some embodiments, leaks in the vicinity of the chip trigger an alarm and/or shutoff mechanism, so that further leakage and chip damage are minimized. Though the invention is described in the context of a fluid cooling system for microprocessor chips, embodiments of the invention may be adapted for use in the protection of other delicate, non-electronic items such as museum pieces and art items, which can be damaged by exposure to fluid and leaks.

Figure 1:
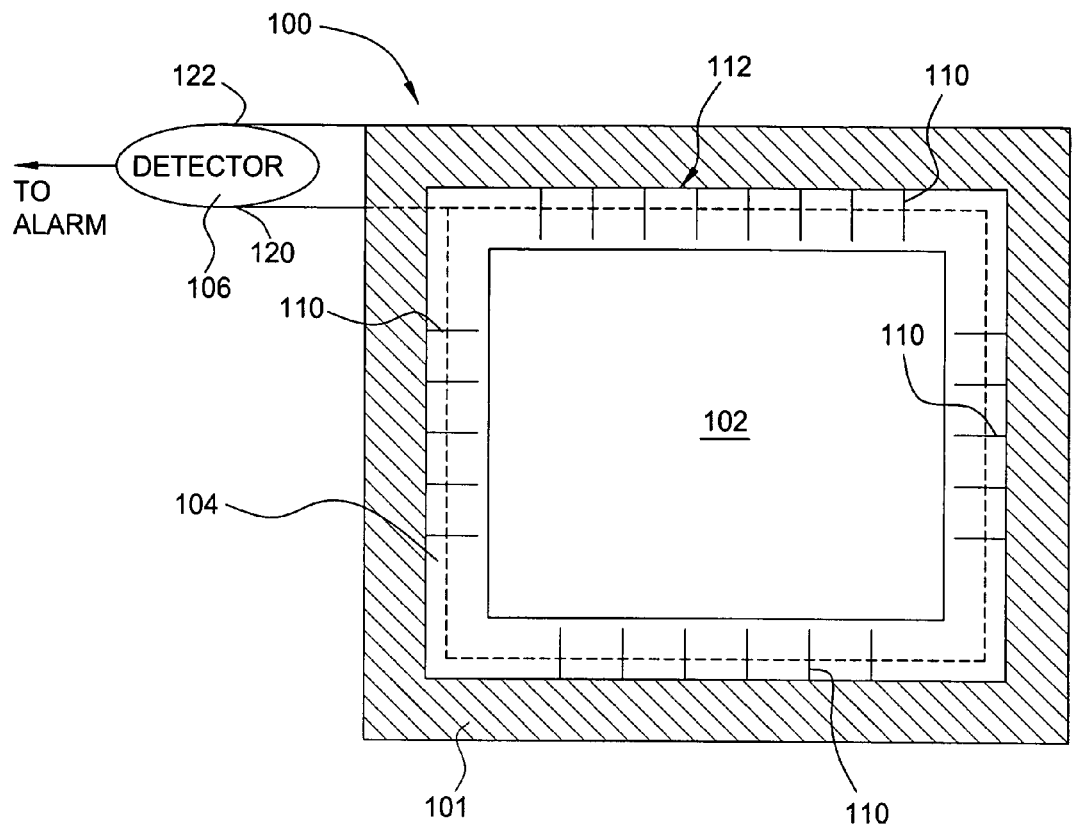
FIG. 1 is a top view of one embodiment of a leak detection system according to the present invention.

FIG. 1 is a top view of one embodiment of a leak detection system 100 according to the present invention. In one embodiment, the leak detection system 100 is adapted for protecting a microprocessor chip 102 that is mounted on a carrier 101 and is cooled by a fluid cooling system (not shown). The leak detection system 100 comprises a chip border 104 (e.g., in the form of a series of thin films deposited on the chip carrier 101) that is coupled to a detector 106, which is in turn coupled to an alarm (not shown).

In one embodiment, the chip border 104 is disposed peripherally about the chip 102 (e.g., is adapted to extend around at least a portion of the periphery of the chip 102). In one embodiment, the chip border 104 extends around the entire periphery of the chip 102. In another embodiment, the chip border 104 is positioned along portions of the chip periphery (e.g., at the corners or at intervals along the sides). The chip border 104 is adapted to detect leaks in the vicinity of the chip 102, and these detected leaks trigger the alarm, which alerts an observer to the presence of the leaks and in some embodiments also activates the shut-off mechanism in order to shut down the fluid cooling system.

In one embodiment, the detector 106 is coupled to an alarm that is an audible or visible alarm, or is an electronic alert sent to a remote monitoring device. In another embodiment, the detector 106 is coupled to a meter (e.g., an ohm meter) that enables an observer to identify the particular location of a leak, as described in further detail below. In one embodiment, the alarm further includes a shut-off mechanism adapted for shutting down the fluid cooling system and/or the protected device (e.g., a microprocessor chip).

Figure 2:
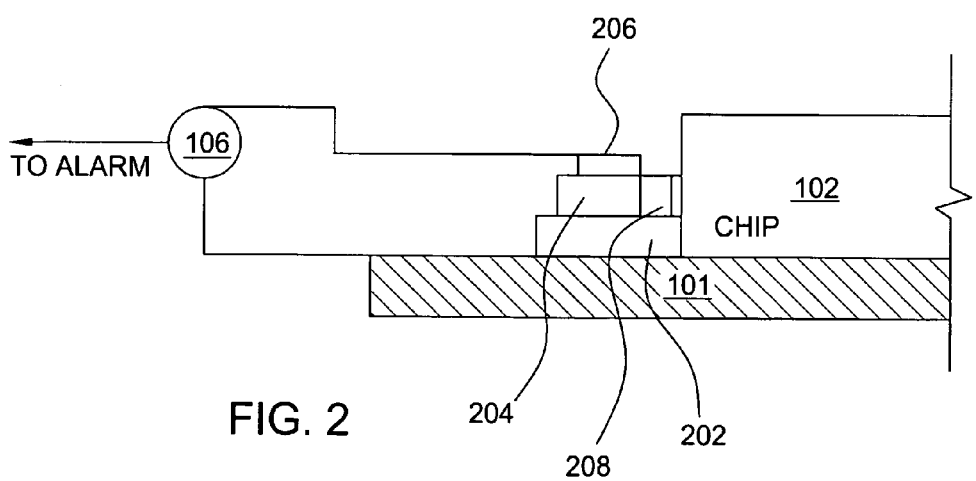
FIG. 2 is a side cross-sectional view of one embodiment of a chip border, wiring and insulating layers e.g., for use in leak detection system illustrated in FIG. 1.

FIG. 2 is a side cross-sectional view of one embodiment of a chip border 104, e.g., for use in leak detection system 100. The chip border 104 comprises a layered structure that is deposited on the chip carrier 101 and extends around at least a portion of the periphery of the chip 102. The chip border 104 is adapted to detect leaks in the vicinity of the chip 102. In one embodiment, the chip border 104 comprises a first conductive layer 202, a hygroscopic layer 204 and a second conductive layer 206.

In one embodiment, the first conductive layer 202 comprises a thin film metal layer that is deposited directly on a portion of the chip carrier 101 and surrounds the periphery of the chip 102. The first conductive layer 202 is electrically coupled to the detector 106 (e.g., at a first detector connection 120). In one embodiment, the first conductive layer 202 is formed from at least one of gold, aluminum and copper. In one embodiment, the first conductive layer 202 has a thickness of approximately 100 to 200 nanometers.

In one embodiment, the hygroscopic layer 204 is deposited upon at least a portion of the first conductive layer 202. The hygroscopic layer 204 is formed of a material that is electrically insulating when dry, but becomes electrically conductive when moist or wet (e.g., when a local humidity level rises above a normal level for the device that the system 100 is protecting). In one embodiment, the hygroscopic layer 204 is formed from at least one of sodium chloride, magnesium-zinc ferrite and lithium chloride. In one embodiment, the hygroscopic layer 204 has a thickness of approximately 100 to 200 nanometers. In another embodiment, the hygroscopic layer 204 may have any thickness relative to the thickness of the first conductive layer 202.

In one embodiment, the second conductive layer 206 comprises a set of conductors or thin strip films deposited on at least a portion of the hygroscopic layer 204, so that the hygroscopic layer 204 separates the first conductive layer 202 from the second conductive layer 206. Thus, when the hygroscopic layer 204 is dry, the hygroscopic layer 204 effectively prevents the completion of an electrical circuit between the first and second conductive layers 202 and 206. Referring back to FIG. 1, in one embodiment, the second conductive layer 206 comprises a plurality of conductors 110 that are spaced several hundreds to several thousands of microns apart (e.g., for a 1×1 centimeter chip, spacing may be on the order of one thousand microns) around the periphery of the chip 102. In one embodiment, the conductors 110 extend in a substantially perpendicular orientation from the first conductive layer 202 and the hygroscopic layer 204. The conductors 110 are each coupled to a peripheral main conductor or thin film 112 (e.g., disposed peripherally about the chip 102) that is in turn electrically coupled to the detector 106 (e.g., at a second detector connection 122).

In another embodiment, the second conductive layer 206 is a thin layer that covers a portion of the hygroscopic layer 204 and is coupled to the main conductor 112. In one embodiment, both the second conductive layer 206 and the main conductor 112 are formed from at least one of gold, aluminum and copper. In one embodiment, the second conductive layer 206 has a thickness that is less than the thickness of the hygroscopic layer 204.

In the event of a leak, moisture or fluid 208 is absorbed by the hygroscopic layer 204, causing the hygroscopic layer 204 to become conductive so that an electrical circuit between the first and second conductive layers 202 and 206 is completed. This causes the electrical circuit to the detector 106 to change to a lower resistance, thereby allowing more current to flow through the circuit to the detector 106. In one embodiment, this increased current flow causes an alarm to be activated, as described in further detail below.

In one embodiment, one or more of the first conductive layer 202, the second conductive layer 206 and the hygroscopic layer 204 is deposited by sputtering, spraying, painting or masking.

Figure 3:
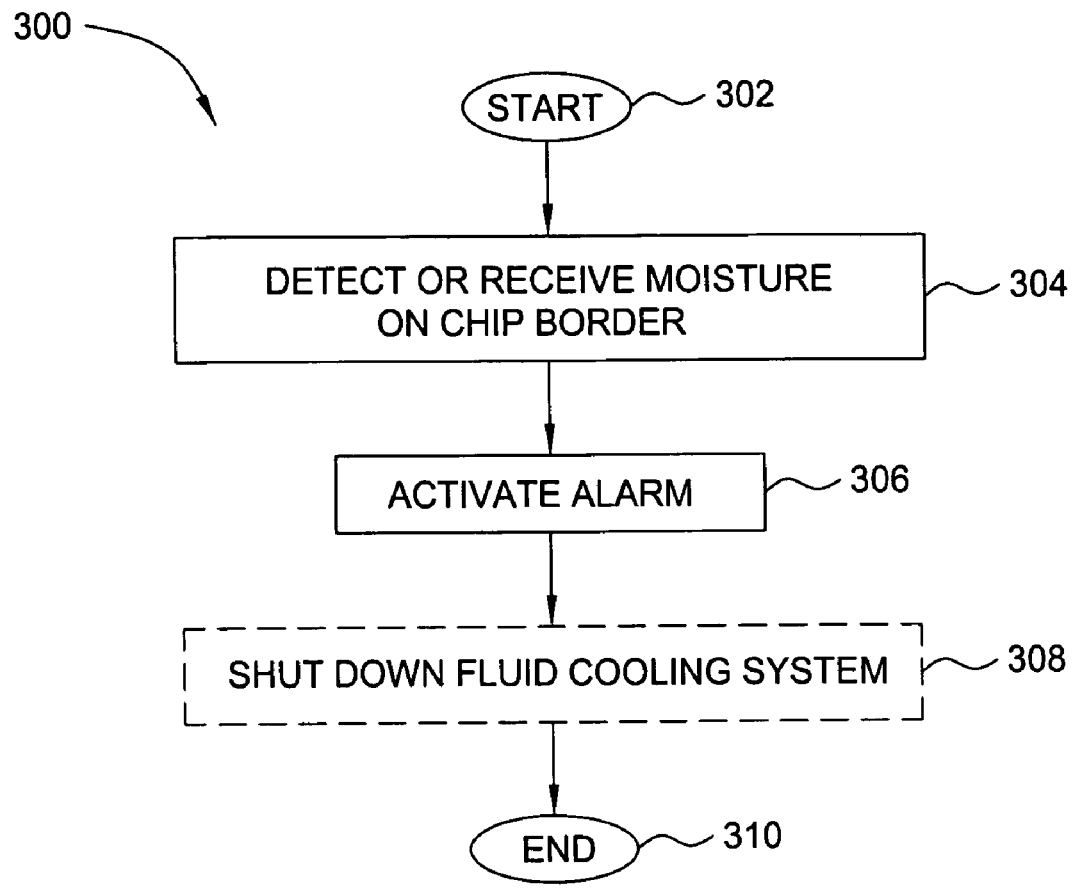
FIG. 3 is a flow diagram illustrating one embodiment of a method for detecting leaks using the leak detection system illustrated in FIG. 1.

FIG. 3 is a flow diagram illustrating one embodiment of a method 300 for detecting leaks using the leak detection system 100. The method 300 is initialized at step 302 and proceeds to step 304, where the method 300 detects or receives moisture or fluid contact in the vicinity of the chip 102, e.g., in the form of a leak dripping onto the chip border 104. In one embodiment in which cooling or other fluid is leaking in the vicinity of the chip 102, drops of fluid or moisture (e.g., 208 in FIG. 2) travel onto the hygroscopic layer 204 via the second conductive layer 206.

In step 306, the method 300 activates an alarm in response to the detection of moisture, thereby alerting an observer to the presence of the leak. In one embodiment, the alarm is activated when current flow to the detector 106 is increased through an electrical circuit between the second conductive layer 206 and the first conductive layer 202. In one embodiment, the completion of the circuit is achieved when the hygroscopic layer 204 that separates the first and second conductive layers 202 and 206 is moistened, which greatly increases the hygroscopic layer's conductivity and provides an electrically conductive path between the first and second conductive layers 202 and 206.

In one embodiment, the activated alarm is at least one of an audible alarm (e.g., a siren), a visual alarm (e.g., a flashing light), or an alert sent to a remote monitoring device (e.g., an electronic message). In another embodiment, the alarm is a meter (e.g., an ohm meter) that indicates a change in resistance of an electrical circuit formed at least in part by the chip border 104. In this embodiment, the resistance of the circuit is calibrated so that the alarm allows an observer to identify the particular location of a leak (e.g., as measured by the resistance or change in resistance of the circuit caused by the leak). In optional step 308 (illustrated in phantom), the method 300 automatically shuts down the fluid cooling system to prevent further leakage, e.g., by activating a shut-off mechanism such as the one described with reference to FIG. 1.

In one embodiment, the leak detection system illustrated in FIGS. 2 and 3 further comprises a mechanism for identifying the location of the detected leak. In one embodiment, this mechanism comprises a resistance meter in series with the second conductive layer 206. In another embodiment, a resistance bridge may be used in combination with the hygroscopic layer 204 in order to monitor resistance changes in the hygroscopic layer 204. A feedback loop may be implemented to shut down a leak source when the resistance exceeds a predefined threshold value. At the same time, the resistance of either of the two conducting layers 202 and 206 may be calibrated to provide the location of the leak in terms of the resistance, e.g., as shown on an ohm meter or bridge circuit.

Figure 4:
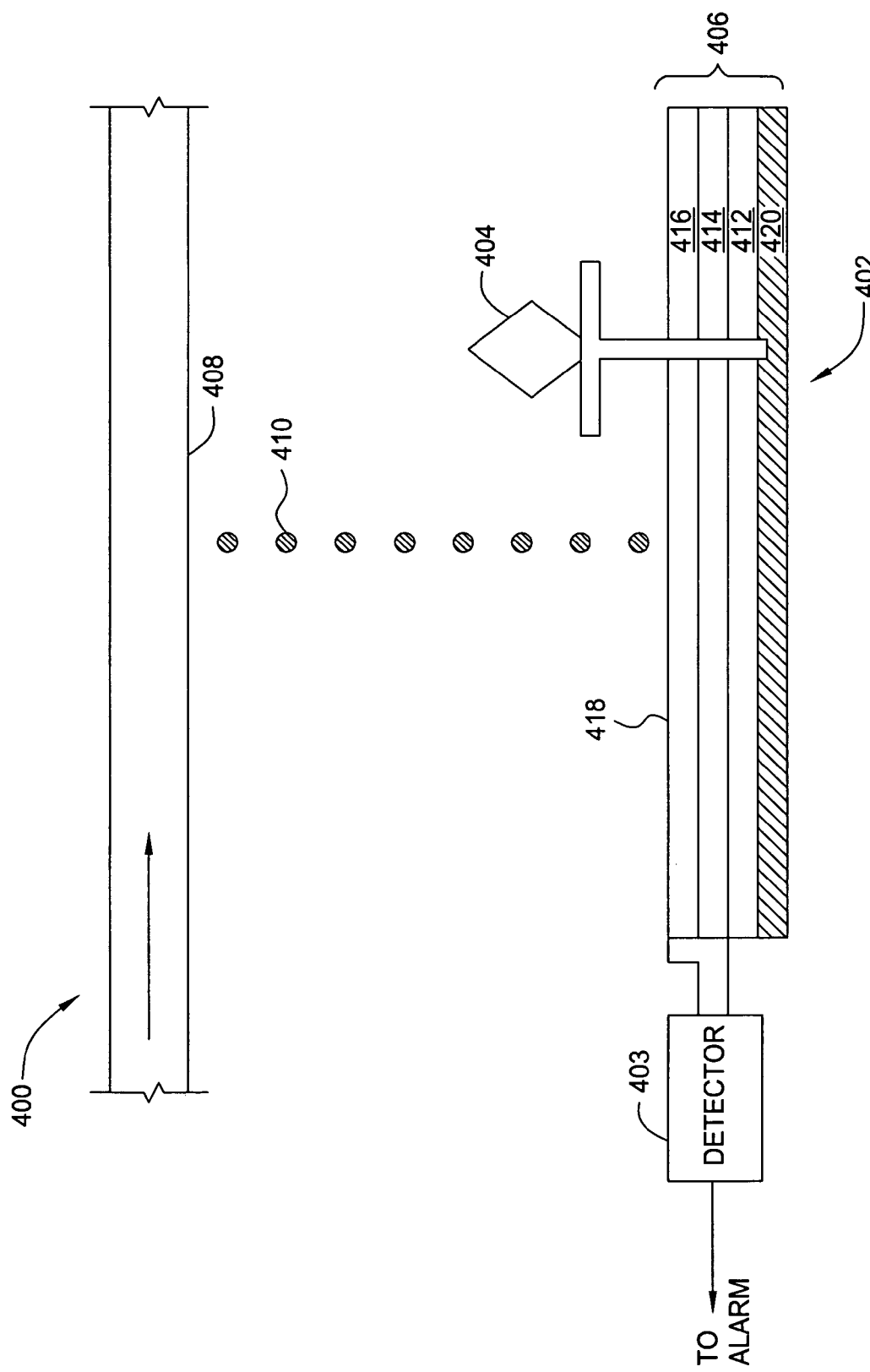
FIG. 4 is a schematic diagram illustrating another embodiment of a leak detection system according to the present invention.

FIG. 4 is a schematic diagram illustrating another embodiment of a leak detection system 400 according to the present invention. In one embodiment, a leak detection system such as that described previously herein may be adapted to protect other delicate or sensitive items against fluid damage, such as artwork and museum pieces. In the embodiment illustrated in FIG. 4, the leak detection system 400 is deployed to protect a museum piece 404.

The leak detection system 400 is substantially similar to the system 100 illustrated in FIG. 1 and comprises a border 406 disposed peripherally about the museum piece 404 and coupled to a detector or electrical indicator 403. The border 406, like the border 104, comprises an insulating layer 420, a first conductive layer 412, a hygroscopic layer 414 and a second conductive layer 416, e.g., comprising a plurality of thin strip films or wires.

When a leak (e.g., from a leaking pipe 408) is present in the vicinity of the museum piece 404, drops 410 of moisture or fluid fall onto the hygroscopic layer 414 of the border 406, thereby increasing the conductivity of the hygroscopic layer 414 and completing an electrical circuit between the first and second conductive layers 412 and 416 that activates the detector 403 and/or an alarm coupled to the detector 403, so that action may be taken to further protect the museum piece 404 and/or control the source of the leak.

Figure 5:
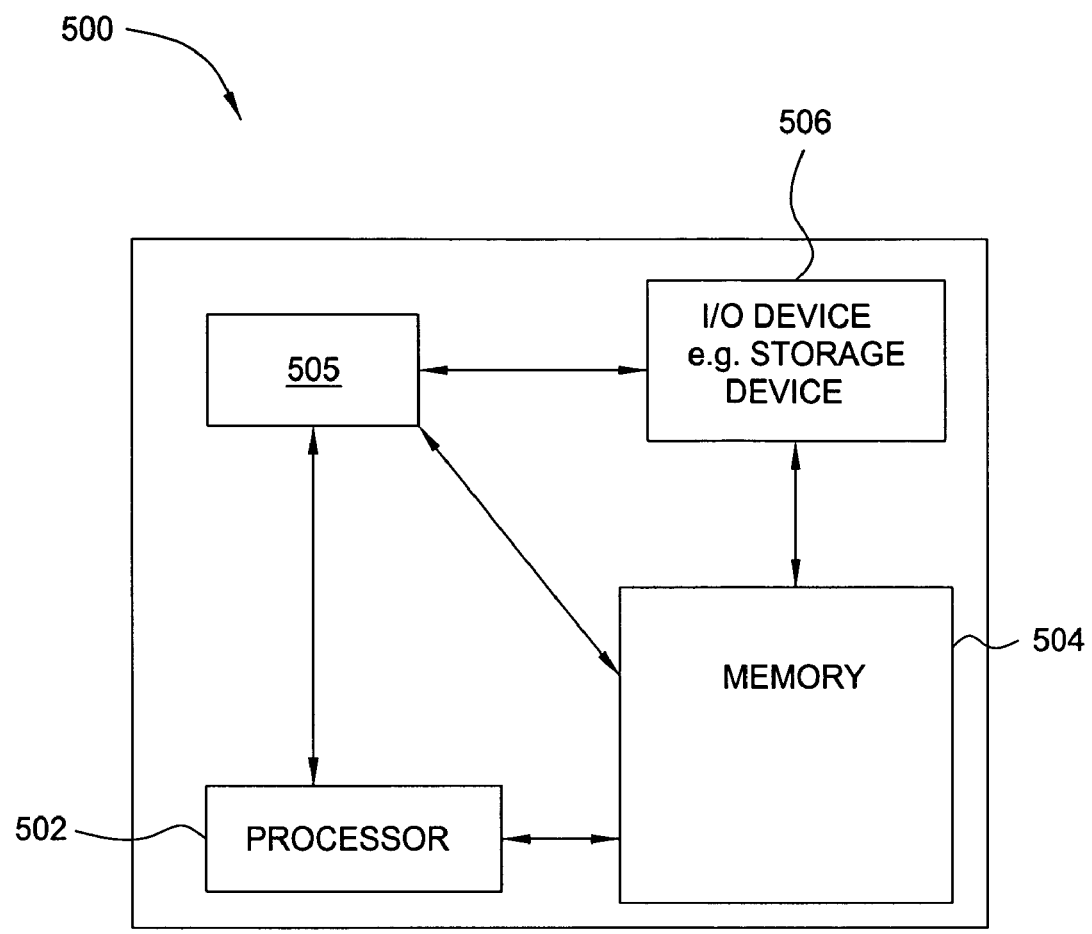
FIG. 5 is a high level block diagram of the present leak detection method that is implemented using a general purpose computing device.

FIG. 5 is a high level block diagram of the present leak detection method that is implemented using a general purpose computing device 500. In one embodiment, a general purpose computing device 500 comprises a processor 502, a memory 504, a leak detection module 505 and various input/output (I/O) devices 506 such as a display, a keyboard, a mouse, a modem, and the like. In one embodiment, at least one I/O device is a storage device (e.g., a disk drive, an optical disk drive, a floppy disk drive). It should be understood that the leak detection module 505 can be implemented as a physical device or subsystem that is coupled to a processor through a communication channel.

Alternatively, the leak detection module 505 can be represented by one or more software applications (or even a combination of software and hardware, e.g., using Application Specific Integrated Circuits (ASIC)), where the software is loaded from a storage medium (e.g., I/O devices 406) and operated by the processor 502 in the memory 504 of the general purpose computing device 500. Thus, in one embodiment, the leak detection module 505 for detecting leaks described herein with reference to the preceding Figures can be stored on a computer readable medium or carrier (e.g., RAM, magnetic or optical drive or diskette, and the like).

Thus, the present invention represents a significant advancement in the field of leak detection systems. A method and apparatus are provided that enable leaks, e.g., in fluid cooling systems or other fluid-based systems, to be rapidly detected. In some embodiments, leaks in the vicinity of a protected object (e.g., a microprocessor chip or a museum piece) trigger an alarm and/or shutoff mechanism, so that further leakage and damage to the protected item are minimized.

While foregoing is directed to the preferred embodiment of the present invention, other and further embodiments of the invention may be devised without departing from the basic scope thereof, and the scope thereof is determined by the claims that follow.

What is claimed is:

1. Apparatus for detecting fluid leaks in the vicinity of a protected item, the apparatus comprising:
   a detector; and
   a border disposed peripherally about said protected item for completing an electrical circuit with said detector when said border is exposed to moisture, said border comprising:
      a first conductive layer coupled to said detector at a first detector connection;
      a second conductive layer coupled to said detector at a second detector connection and further coupled to a main wire that is peripherally disposed about said protected item and is electrically coupled to said detector; and
      a hygroscopic layer disposed between said first conductive layer and said second conductive layer, wherein said hygroscopic layer comprises a material that is substantially electrically insulating when dry, but becomes electrically conductive when exposed to moisture.

2. The apparatus of claim 1, wherein said second conductive layer is formed from at least one of gold, aluminum and copper.

3. The apparatus of claim 1, wherein said apparatus is adapted for protecting a museum piece or art item.

4. The apparatus of claim 1, wherein said first conductive layer comprises a thin film metal layer formed from at least one of gold, aluminum and copper.

5. The apparatus of claim 1, wherein said first conductive layer has a thickness of approximately 100 to 200 nanometers.

6. The apparatus of claim 1, wherein said hygroscopic layer is formed from at least one of sodium chloride, magnesium-zinc ferrite and lithium chloride.

7. The apparatus of claim 1, wherein said hygroscopic layer has a thickness of approximately 100 to 200 nanometers.

8. The apparatus of claim 1, wherein said second conductive layer comprises:
   a plurality of wires or thin films disposed in a substantially perpendicular orientation relative to said first conductive layer.

9. The apparatus of claim 8, wherein wires in said plurality of thin films or wires are spaced at least several hundreds of microns apart.

10. The apparatus of claim 1, further comprising:
    an alarm coupled to said detector; and
    a shut-off mechanism coupled to said alarm and adapted for shutting down a source of said fluid leak.

11. The apparatus of claim 10, wherein said alarm is at least one of an audible alarm, a visual alarm, an alert sent to a remote device, or a meter.

12. The apparatus of claim 1, further comprising:
    an insulating layer disposed beneath said first conductive layer.

13. The apparatus of claim 12, wherein said insulating layer is a carrier of a microprocessor chip.

14. Apparatus for detecting fluid leaks in the vicinity of a protected item, the apparatus comprising:
    a detector; and
    a border disposed peripherally about said protected item for completing an electrical circuit with said detector when said border is exposed to moisture, said border comprising:
       a first conductive layer coupled to said detector at a first detector connection;
       an insulating layer embodied in a microprocessor chip carrier and disposed beneath said first conductive layer;
       a second conductive layer coupled to said detector at a second detector connection; and
       a hygroscopic layer disposed between said first conductive layer and said second conductive layer, wherein said hygroscopic layer comprises a material that is substantially electrically insulating when dry, but becomes electrically conductive when exposed to moisture.

15. The apparatus of claim 14, wherein said first conductive layer comprises a thin film metal layer formed from at least one of gold, aluminum and copper.

16. The apparatus of claim 14, wherein said first conductive layer has a thickness of approximately 100 to 200 nanometers.

17. The apparatus of claim 14, wherein said hygroscopic layer is formed from at least one of sodium chloride, magnesium-zinc ferrite and lithium chloride.

18. The apparatus of claim 14, wherein said hygroscopic layer has a thickness of approximately 100 to 200 nanometers.

19. The apparatus of claim 14, wherein said second conductive layer is formed from at least one of gold, aluminum and copper.

20. The apparatus of claim 14, wherein said second conductive layer comprises:
   a plurality of wires or thin films disposed in a substantially perpendicular orientation relative to said first conductive layer.

21. The apparatus of claim 20, wherein wires in said plurality of thin films or wires are spaced at least several hundreds of microns apart.

22. The apparatus of claim 14, further comprising:
   an alarm coupled to said detector; and
   a shut-off mechanism coupled to said alarm and adapted for shutting down, a source of said fluid leak.

23. The apparatus of claim 22, wherein said alarm is at least one of an audible alarm, a visual alarm, an alert sent to a remote device, or a meter.

* * * * *